United States Patent

Dietz

[15] 3,701,310
[45] Oct. 31, 1972

[54] PHOTOGRAPHIC SHUTTER WITH ELECTRONIC TIME SETTING DEVICE

[72] Inventor: Ernst Hermann Dietz, Calmbach/Black Forest, Germany

[73] Assignee: Prontor-Werke Alfred Gauthier GmbH, Calmbach/Schwarzwald, Germany

[22] Filed: Feb. 24, 1970

[21] Appl. No.: 13,449

[52] U.S. Cl. ................................................95/53 E
[51] Int. Cl. ..............................................G03b 9/00
[58] Field of Search ........95/53, 53 E, 53 EA, 53 EB, 95/58, 59, 62, 63

[56] References Cited

UNITED STATES PATENTS

| | | | |
|---|---|---|---|
| 3,504,611 | 4/1970 | Richter | 95/53 X |
| 3,410,188 | 11/1968 | Kiper | 95/63 X |
| 2,782,698 | 2/1957 | Hill | 95/63 X |
| 3,099,197 | 7/1963 | Kiper | 95/63 |
| 3,362,311 | 1/1968 | Singer | 95/53 |

*Primary Examiner*—Samuel S. Matthews
*Assistant Examiner*—Monroe H. Hayes
*Attorney*—March, Le Fever and Wyatt

[57] ABSTRACT

A photographic shutter includes a reciprocating drive element that places the shutter segments in the open and closed position and cooperates with an electronically controlled time setting device having an electromagnetic open-time-block operable to hold the drive element in the open position during the exposure time. The time setting device has a contact switch operable by a shutter release member to switch on the time setting device. Advantageously a nose is provided on the shutter release member which is engagable with a pin on the drive element during the opening movement of the segment drive element. The engagement of the nose with the pin prevents the return of the shutter release member for the period of time during which the drive element is blocked by the electromagnetic open-time-block.

2 Claims, 3 Drawing Figures

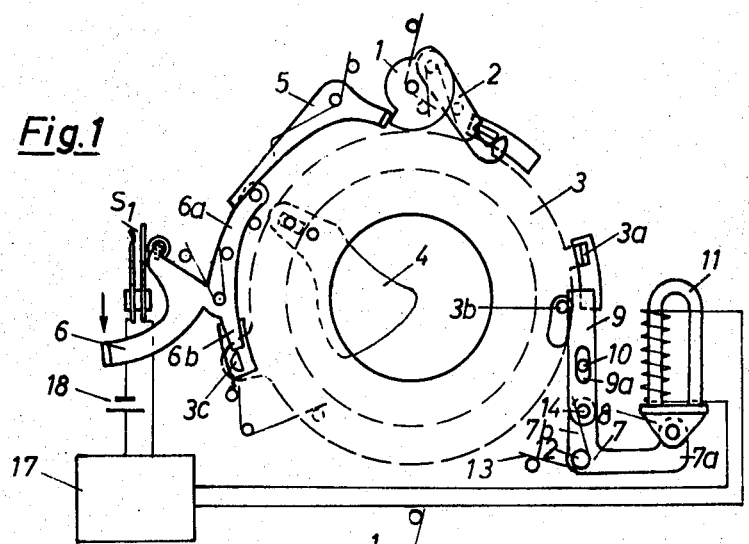
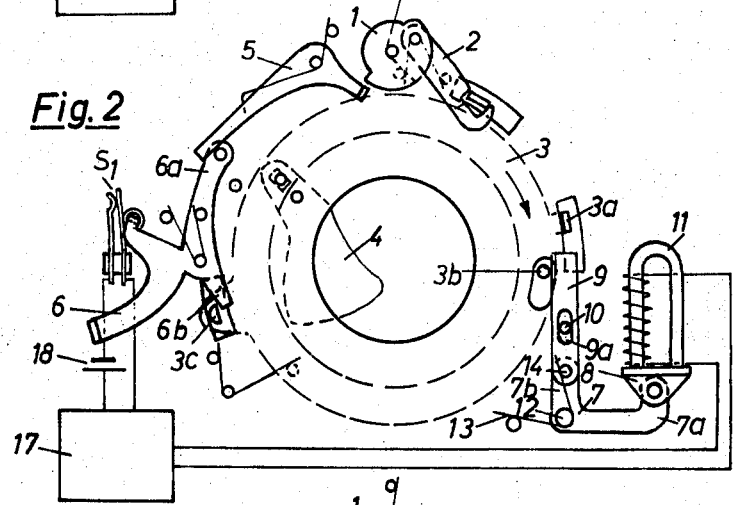
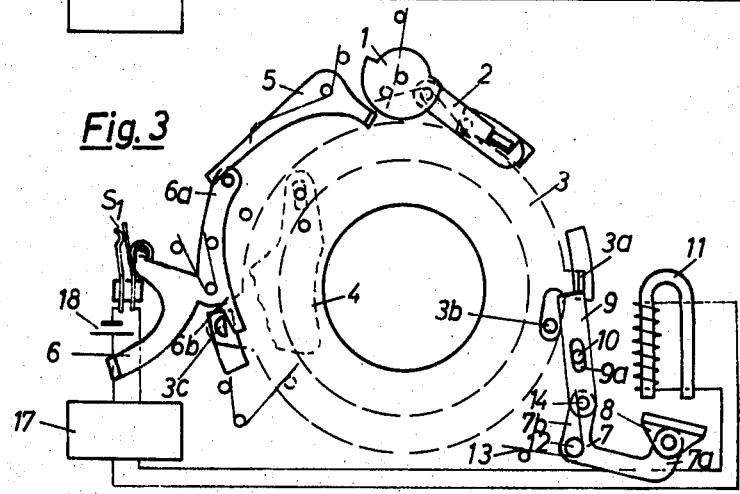

PHOTOGRAPHIC SHUTTER WITH ELECTRONIC TIME SETTING DEVICE

FIELD OF BACKGROUND OF THE INVENTION

This invention relates to a photographic shutter with a reciprocating drive element which moves the shutter blades or segments into the open position and the shut positions. The shutter also has an electronically controlled time-setting device that includes an open-time block. The electronically controlled time-setting device can be activated by a contact switch which is operable by means of the shutter release.

Prior photographic shutters of the type mentioned above have been provided with a shutter release lever having another lever adapted to follow the shutter release lever upon actuation thereof. The follow lever, simultaneously with the shutter release, closes a contact switch which connects the electronic time-setting device with the battery voltage. To assure the closing of this switch for the duration of the exposure time, it was necessary to provide an additional return-movement block to hold the shutter release lever in the release position. This return-release block can be moved out of the blocking position by the shutter drive. This arrangement has the disadvantage of requiring a number of components as well as additional space for the return-movement block.

In connection with an electronic shutter with two segment rings that are held by magnets in cocked position, and wherein the rings are adapted to run off one after the other, it has been known to provide a spring-equipped return-movement block for the shutter release which block upon release acts upon a contact switch. This is done in such a way that the shutter release, after operation of the contact switch, can only return to the original position after the lock ring has been released by the holding magnets assigned to it to change the shutter segments into the closed position. The use of such a return-movement block is limited to electronic shutters with shutter segments supported by two segment rings that run off one after the other. This type of a return-movement block which holds the contact switch in locked position during the exposure process is not suited for a shutter with a segment drive that reciprocates or moves back and forth.

SUMMARY OF THE INVENTION

It is an object of this invention to provide a return-movement block or stop for the shutter release, which, without significant additional structure, works with the shutter release and is controlled directly by a control part which is in its normal position when the shutter is open.

It has now been found that the foregoing and related objects can be readily attained in a photographic shutter having a lug fitted to the shutter release, and a pin or similar structure fitted to the drive element of the segments. In the course of the opening movement of the segment drive element, the pin runs onto the lug and impedes the return of the shutter release into its original position for the period of time during which the drive element is locked by the electromagnetic open-time block. Thus a return-movement block is advantageously created which includes the shutter release itself, with highly desirable structural simplicity. The design functions with maximum reliability, and the current feed to the time-setting device is securely maintained as long as the segments are in the fully open position during the exposure process.

For an understanding of the principles of the invention, reference is made to the following description of a typical embodiment thereof, as illustrated in the accompanying drawing.

BRIEF DESCRIPTION OF THE DRAWING

In the drawing:

FIG. 1 illustrates a shutter blade drive mechanism of a photographic shutter with electronic time control that includes an electromagnetic open-time block, the shutter drive being shown in the cocked position;

FIG. 2 is similar to FIG. 1 and illustrates the shutter design after the release has been actuated with the shutter drive release to run off and the contact switch connecting the electronic time-setting device to the battery voltage closed; and FIG. 3 is similar to FIG. 1 and illustrates the shutter design in a moving phase wherein the exposure opening has been freed by the shutter blades, while a pin fitted to the shutter drive element prevents the shutter release from moving back and thereby holds the contact switch in closed position until the shutter drive element has completed the return phase and has freed the shutter release for return to its original position.

DESCRIPTION OF THE PREFERRED EMBODIMENT

Referring now in detail to the drawing, FIGS. 1–3 illustrate a shutter blade drive mechanism of a photographic shutter with electronic time control switching wherein a spring-loaded drive disc 1 as well as a drive lever 2 flexibly attached to it, serve as the drive mechanism. The drive lever 2 is engaged in a form-locking manner with a segment drive element 3 which may, for instance, be in the form of a ring. The ring drive element 3 operates the shutter blades or segments 4, of which only one is shown for clarity of illustration. In the clocked position illustrated in FIG. 1, the segment drive mechanism is completely locked by means of a spring-loaded locking lever 5. This lever 5 in turn can be moved out of the locked position by a spring-loaded release lever 6. When the release mechanism 5, 6 is actuated, the segment drive element 3 is driven by the crank gear 1, 2 in the direction of the arrow indicated in FIG. 2. As this occurs a tang 3a provided on the circumference of the drive element 3 engages one side of an anchor lever 7 located in its path before reverse of the movement. This anchor lever 7 is designed as a two-arm lever rotatable about a fixed point, one of the arms 7a carries an anchor 8, and the other arm 7b forms a knee lever together with another rotatably connected support lever 9 which is mounted, for example, by means of a pin-slot guide 10, 9a. The two-armed anchor lever 7 is rotatable about a stationary pin 12 and is located relative to the reciprocating segment ring 3 in such a way that the tang 3a touches the face of the support lever 9 before the return phase of the segment ring 3 is reached. The bearing pin 12 carries a wound spring 13 which has one end engaged with a stationary support and its other end connected with a pin 14 which rotatably connects the arm 7b with the support lever 9. The spring 13 applies a biasing force tending bend the part of the anchor lever 7 designed as a knee lever and to simultaneously urge the anchor 8 away from the magnet 11. This movement is prevented by a lug 3b mounted on the segment ring 3, as illustrated in FIG. 1, because the support lever 9 rests upon the lug 3b which acts in opposition to the spring 13 and thereby secures the knee lever 7b, 9 in the extended position.

The electromagnet 11 is assigned to the anchor 8 which is carried by the lever 7. This electromagnet is part of a circuit of a conventional time-setting device 17 that is only schematically indicated in the drawing for clarity. A contact switch $S_1$, placed in the range of movement of the release lever 6, is provided for the purpose of connecting the time-setting device 17, designed as a sweep circuit including resistance capacitance members, and the holding magnet 11 to the voltage of the battery 18 prior to release of the shutter drive. The circuit of the electronic time-setting device 17 has another switch (not shown) which is operated by the segment ring 3 and serves in a well-known manner to initiate the functioning of the time-setting device and to restore the short circuit in the condenser of the time control circuit upon return to the original position.

The lever 6, in addition to lever arm 6a which operates with the blocking lever 5, is also provided with a nose 6b for the purpose of holding the release lever 6, and thereby the contact switch $S_1$ operable by this lever, securely in the contact position for the period of the exposure, that is in open position of the segments 4. A pin 3c is fitted to the segment ring 3 and cooperates with the nose 6b, as illustrated in FIG. 3, so that when the pin 3c moves itself in front of the nose 6b during the opening movement of the segment ring 3, the pin 3c impedes the release lever 6, and simultaneously prevents the closed switch $S_1$ from going back to its original open position, until the segment ring is once again released by the open-time-blocking mechanism 7 to 12 and returns to the original position. Instead of the pin 3c a bent tang or similar piece may be mounted on segment ring 3.

In detail the functioning of the above described shutter design is as follows:

As explained above, when the release mechanism 5, 6 is operated, initially the contact switch $S_1$ is closed, which results in the establishment of a magnetic field opposes that holds anchor 8 against the magnet 11. This magnetic field opposes the spring 13 biasing the pivot pin 14 and holds the anchor lever in the position shown in FIG. 1. When the release lever 6 is actuated, the drive mechanism 1, 2 is simultaneously feed and moves the segment ring 3 in the opening direction as indicated by the arrow in FIG. 2. The tang 3a, mounted on to the segment ring 3 then runs onto the face of the support lever 9 prior to reaching the return position of the segment ring, and battery charging start switch (not shown for clarity of illustration) commences the time setting process in the electronic control circuit 17. In the position now occupied by segment ring 3, corresponding to the open position of segments 4, the pin 3c is positioned in front of the nose 6b of the release lever 6, whereby this latter is prevented from a return movement, even in the event of premature release. Only when the time setting device 17 has completed its operation, and the holding magnet 11 has released the blocking lever 7, 9 allowing it to bend, is it possible for segment ring 3 to continue its movement, and to return to its original position while simultaneously closing the segments 4. When this is accomplished, the pin 3c will have moved away from the nose 6b of the release lever 6, so that the release lever 6 can move back to its original position, while at the same time opening the contact switch $S_1$.

It will be understood that the foregoing description with the details of exemplary structure is not to be construed in any way to limit the invention, but that modifications may be made thereto without departing from the scope of the invention as set forth in the following claims.

Having thus described my invention, I claim:

1. In a photographic shutter having an oscillatable drive element moving shutter segments between the open and closed positions, an electronically controlled time setting device including an electromagnetic open-time-block, the drive element being cooperable with the time setting device and the open-time-block being operable to hold the drive element in the open position during the exposure time, and a shutter release member cooperable with the drive element and operable to activate the time-setting device upon operation of the release member: the improvement comprising, in combination, said release member being pivoted and having a first arm controlling release of said drive element, a second arm operable to activate said time setting device, and a nose; said nose extending from the pivot of said release member; and a pin on said drive element engageable with said nose; said nose, responsive to pivoting of said release member to the release position to activate said time setting device, being moved inwardly of the circular path of movement of said pin, and said pin being rotated by the released drive element into engagement with the outer surface of said nose to retain said release member in the release position during the time said drive element is blocked by said electromagnetic open-time-block.

2. In a photographic shutter, the improvement claimed in claim 1, including a switch controlling activation of said time setting device; said second arm actuating said switch upon pivoting of said release member to the release position.

* * * * *